US012403567B2

(12) United States Patent
Begin

(10) Patent No.: US 12,403,567 B2
(45) Date of Patent: Sep. 2, 2025

(54) DUAL-FUNCTION GRIP-MOUNT DEVICE

(71) Applicant: Jason Begin, Roswell, GA (US)

(72) Inventor: Jason Begin, Roswell, GA (US)

( * ) Notice: Subject to any disclaimer, the term of this patent is extended or adjusted under 35 U.S.C. 154(b) by 355 days.

(21) Appl. No.: 18/085,999

(22) Filed: Dec. 21, 2022

(65) Prior Publication Data

US 2024/0208009 A1 Jun. 27, 2024

Related U.S. Application Data

(60) Provisional application No. 63/292,003, filed on Dec. 21, 2021.

(51) Int. Cl.
*B25B 5/16* (2006.01)

(52) U.S. Cl.
CPC .................................... *B25B 5/163* (2013.01)

(58) Field of Classification Search
CPC ........... B25B 5/163; B25B 5/06; B25B 5/068; B25B 5/085; B25B 5/16; B25B 7/18; B25B 5/02; B25B 7/04; B25B 7/16
See application file for complete search history.

(56) References Cited

U.S. PATENT DOCUMENTS 8,646,766 B2 * 2/2014 Shrock ...................... B25B 5/08 269/143
2005/0098932 A1 * 5/2005 Panosian ................. B25B 5/006 269/37

* cited by examiner

*Primary Examiner* — Jason L Vaughan
*Assistant Examiner* — Amanda Kreiling

(57) ABSTRACT

A dual function grip-mount device includes a rigid housing including a cavity therein, a flexible grip head slidable from an open position above the rigid housing into a closed position nested within the cavity of the rigid housing, a ratchet strap attached to a center bottom portion of the flexible grip head and extending downward from the flexible grip head into the cavity of the rigid housing, and a ratchet release to engage the ratchet strap.

14 Claims, 6 Drawing Sheets

DUAL-FUNCTION GRIP-MOUNT DEVICE

TECHNICAL FIELD

Embodiments described herein generally relate to grip and mount devices, and more particularly to a dual function grip-mount device and method of manufacturing the same.

BACKGROUND

Gripping devices are commonly used to hold an object, such as, fishing tools, hunting tools, firearms, etc. Existing gripping devices rely on friction to hold the object and are lacking with respect to lock capabilities. Friction solutions are not reliably secure and may cause damage to the object being held, especially during sliding of the object into position. Also, the existing gripping devices are not able to securely hold the object since they may not be able to sufficiently lock the object in the device. Moreover, existing gripping devices are lacking with respect to dual functionality for mounting capabilities as well. Hence, an improved gripping device is desired.

This Background section may contain recognitions of one or more problems in the related art that were derived in conjunction with the embodiments presented herein. Accordingly, none of this Background section should be considered as "admitted" in the public domain prior to the effective filing date of this application.

SUMMARY

An aspect of the disclosure is to provide an improved gripping device and method of manufacturing the same.

According to an embodiment, a dual function grip-mount device may include a rigid housing including a cavity therein, a flexible grip head slidable from an open position above the rigid housing into a closed position nested within the cavity of the rigid housing, a ratchet strap attached to a center bottom portion of the flexible grip head and extending downward from the flexible grip head into the cavity of the rigid housing, and a ratchet release to engage the ratchet strap.

The ratchet release may engage the ratchet strap when the flexible grip head is slid into the closed position nested within the cavity of the rigid housing, and the ratchet release may disengage the ratchet strap upon actuation of the ratchet release, and the flexible grip head slides to the open position above the rigid housing.

The ratchet release may include a button or switch that disengages a ratchet buckle from the ratchet strap.

The rigid housing may be wishbone shaped, and the flexible grip head and the ratchet strap collectively have a wishbone shape.

The flexible grip head may include a flexible shell, and a plurality of flexible gripper teeth fixedly connected to the flexible shell.

The flexible gripper teeth and the flexible shell may be integral to each other.

The flexible shell may include a first arm portion, a second arm portion, a first extended end extending out from the first arm portion, and a second extended end extending out from the second arm portion.

The first extended end and the second extended end may be brought closer together when the flexible grip head is slid into the closed position nested within the cavity of the rigid housing, and the first extended end and the second extended end are extended farther from each other when the flexible grip head slides to the open position above the rigid housing.

The dual function grip-mount device may further include a mount attachment point to attach the dual function grip-mount device to an external accessory or accessory interface.

The mount attachment point may include a hole in the rigid housing.

The dual function grip-mount device may further include a fastener engaged in the hole and a knob engaged with the fastener.

According to another embodiment a device may include a wishbone shaped housing including a cavity therein, a grip head slidable from an open position above the wishbone shaped housing into a closed position nested within the cavity of the wishbone shaped housing, a ratchet strap attached to the grip head and extending from the grip head into the cavity of the wishbone shaped housing, and a ratchet release to engage the ratchet strap. The grip head and the ratchet strap may collectively have a wishbone shape, the ratchet release may engage the ratchet strap when the grip head is slid into the closed position nested within the cavity of the wishbone shaped housing, and the ratchet release may disengage the ratchet strap upon actuation of the ratchet release, and the grip head slides to the open position above the wishbone shaped housing.

The device may further include a mount attachment point to attach the device to an external accessory or accessory interface.

According to yet another embodiment, a method of manufacturing a dual function grip-mount device may include forming a rigid housing including a cavity therein, forming a flexible grip head slidable from an open position above the rigid housing into a closed position nested within the cavity of the rigid housing, attaching a ratchet strap to a center bottom portion of the flexible grip head to extend downward from the flexible grip head into the cavity of the rigid housing, and providing a ratchet release to engage the ratchet strap.

Exemplary embodiments disclosed herein describe a dual function grip-mount device. The device may include a grip head and a ratchet mechanism which allows the device to securely grip or mount to an object. Additional features and utilities of the embodiments will be set forth in part in the description which follows and, in part, may be learned by practice of the principles of the disclosure.

BRIEF DESCRIPTION OF THE DRAWINGS

Elements in the figures have not necessarily been drawn to scale in order to enhance clarity and to improve an understanding of these various elements and embodiments of the disclosure. Furthermore, elements not central to this disclosure may not be depicted in order to provide a clear view of the various embodiments.

The various advantages of the embodiments of the present disclosure will become apparent to one skilled in the art by reading the following specification and appended claims, and by referencing the following drawing(s), in which:

DETAILED DESCRIPTION OF THE EMBODIMENTS

Figure 1:
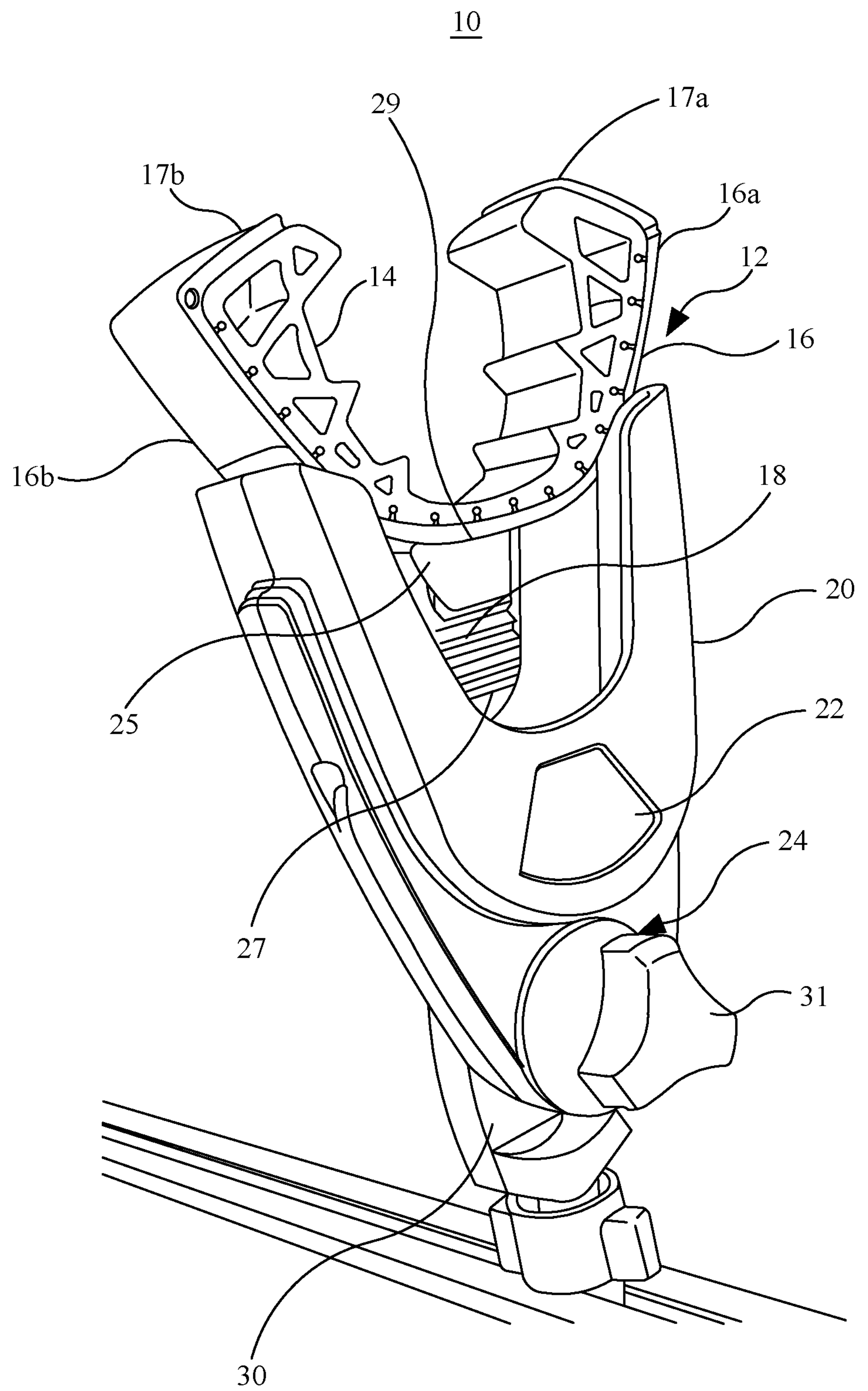
FIG. 1 is a schematic perspective view of a dual function grip-mount device attached to an accessory according to an embodiment of the present disclosure.

Embodiments will now be described with reference to the accompanying drawings. The disclosure may be embodied in many different forms and should not be construed as limited to the embodiments set forth herein. Like reference numerals refer to like elements throughout.

Use of singular forms (e.g., “a”, “an”, “the”) should be interpreted to include plural forms as well (and vice versa), unless the context clearly indicates otherwise.

In the specification and the claims, the term “and/or” is intended to include any combination of the terms “and” and “or” for the purpose of its meaning and interpretation. The terms “and” and “or” may be used in the conjunctive or disjunctive sense and may be understood to be equivalent to “and/or.”

The terms “comprises,” “comprising,” “includes,” and/or “including,”, “has,” “have,” and/or “having,” and variations thereof when used herein, specify the presence of stated elements, but do not preclude the presence or addition of one or more other elements.

The terms “first,” “second,” etc., may be used to describe various elements. However, these elements should not be limited by these terms. Rather, such terms are only used to distinguish one element from another element. For example, a “first” element may be referred to as a “second” element without departing from the scope of the disclosure.

Spatially relative terms such as “below,” “beneath,” “lower,” “above,” “upper,” and the like, may be used herein for ease of description to describe the relationship between one element or component and another element or component, e.g., as illustrated in the drawings, and should not necessarily be limiting. For example, in the case where a part illustrated in the drawing is turned over, the part positioned “below” or “beneath” another part may be placed “above” the other part.

In the interest of brevity, elements or operations that are substantially the same as those already described will generally not be fully described again.

It should be understood that when an element is referred to as being “connected” or “coupled” to another element, it can be directly connected or coupled to the other element or intervening elements may be present. In contrast, when an element is referred to as being “directly connected” or “directly coupled” to another element, there may be no intervening elements present. Other words used to describe the relationship between elements should be interpreted in a like fashion (e.g., “between” versus “directly between,” “adjacent” versus “directly adjacent,” etc.).

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

As noted above, there is a need for an improved gripping device. The present disclosure describes a dual function grip-mount device. The dual function grip-mount device may be used as a gripping mechanism to securely grip an object or as a mounting point to which other objects (e.g., a mounting accessory) may attach. The dual function grip-mount device may include a grip head which may be positioned in a downward direction to attach to an object (e.g., a vehicle) when the dual function grip-mount device is used as a mounting point, and the grip head may be positioned in an upward direction to attach to an object (e.g., a fishing rod or a firearm) when the dual function grip-mount device is used as a gripping mechanism.

Figure 2:
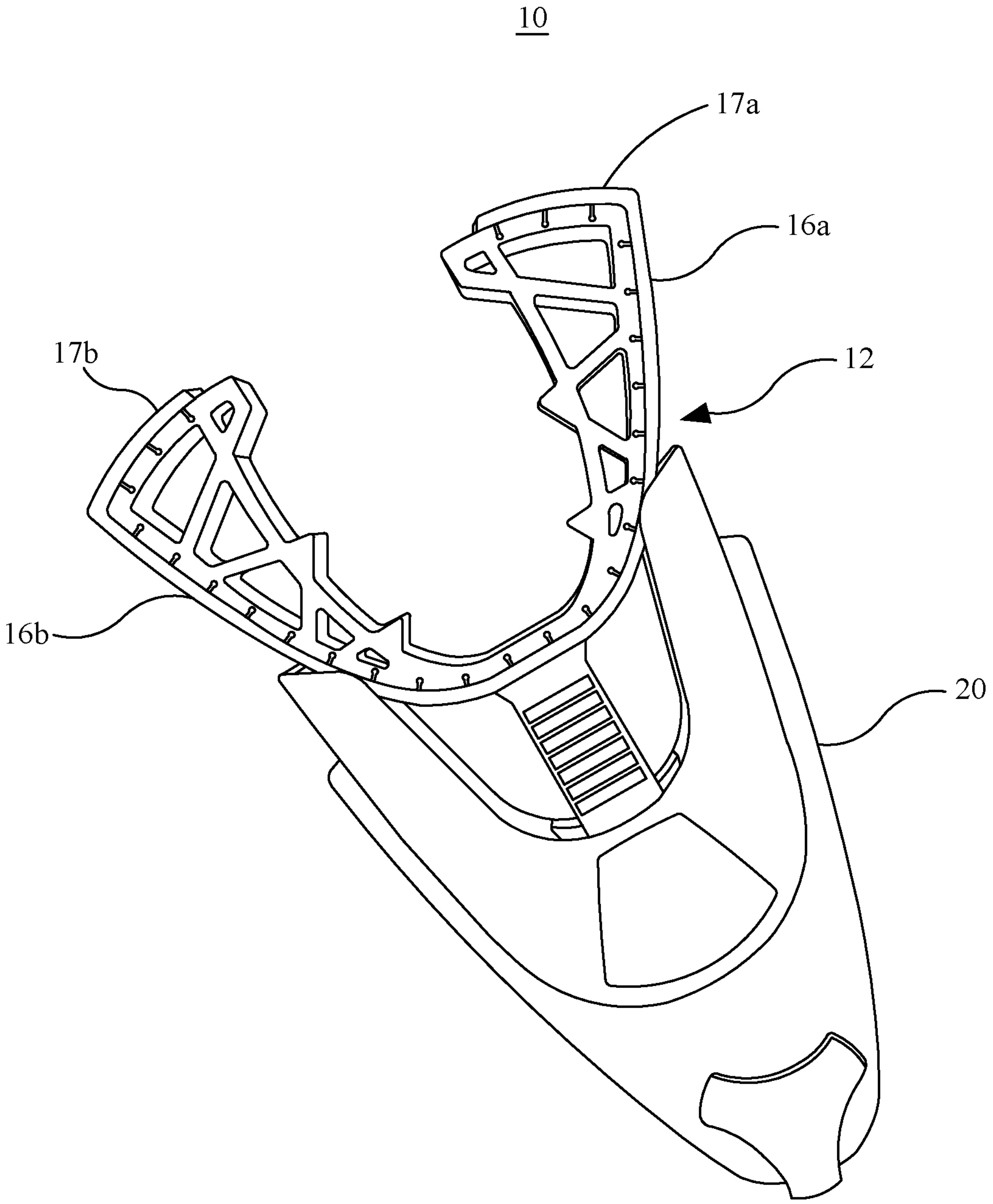
FIG. 2 is a schematic view of the dual function grip-mount device unattached to an accessory according to an embodiment of the present disclosure.

FIG. 1 shows an exemplary side perspective view of a dual function grip-mount device 10 attached to an accessory according to an embodiment of the present disclosure. FIG. 2 shows an exemplary view of the dual function grip-mount device 10 unattached to an accessory according to an embodiment of the present disclosure.

The dual function grip-mount device 10 may include a grip head 12, a ratchet strap 18, a housing 20, a ratchet release 22, and a mount attachment connection point 24.

The dual function grip-mount device 10 may be made out of suitable material(s), such as, for example, plastic, acrylic, and/or metal. In an example embodiment, the dual function grip-mount device 10 may include plastic components such as a hard plastic housing 20 and a flexible shell 16 of the grip head 12. The flexible shell 16 may be formed of rubber or other suitable materials. The housing 20 may be formed of various rigid plastics, composites, or other materials.

The dual function grip-mount device 10 may be configured in any suitable shape. In an example embodiment, the grip head 12 and ratchet strap 18 structure collectively have a wishbone shape and the housing 20 may be configured in a shape complementary to the shape of the flexible shell 16 of the grip head 12. For example, the housing 20 may be wishbone shaped, and may include a cavity (i.e., opening) to receive the grip head 12.

The grip head 12 may be operatively configured to descend into (i.e., nest inside of) housing 20 which causes the grip head 12 to grip and wrap around (i.e., encapsulate) an object. In an open position, the grip head 12 may be disposed above the housing 20 (see FIGS. 1-3 and 5), while in a closed position, the grip head 12 may be disposed nested within the housing 20 (see FIG. 4). For example, the grip head 12 may be slidable from the open position above the housing 20 into the closed position nested within the housing 20.

The grip head 12 may be flexible and operate to securely grip and wrap around an object without having to slide the object into the grip head 12. Rather, the grip head 12 can grip and wrap around an object in a secure fashion using a ratchet mechanism (e.g., ratchet strap 18 and release mechanism 22). The grip head 12 may include multiple flexible gripper teeth 14 which may be enclosed in a flexible shell 16. When downward pressure is applied to the grip head 12, the grip head 12 may slide from the open position to the closed position causing the grip head 12 to close. Moreover, when closing (i.e., going from the open position to the closed position), the flexible gripper teeth 14 may collectively conform to the shape of the object being gripped/wrapped around (i.e., held).

The flexible gripper teeth 14 and the flexible shell 16 may be fixedly constructed together. For example, the flexible gripper teeth 14 and the flexible shell 16 may be integrally formed such as by an overmolding process.

The flexible shell 16 may be a unitary structure including a first arm portion 16*a* and a second arm portion 16*b*. Each arm portion may include an extended end 17*a* and 17*b* respectively, and each extended end may extend out from a respective arm portion in a perpendicular direction. The extended ends 17*a* and 17*b*, along with the remaining arm structure, are configured to create a closure around an enclosed object thereby effectively wrapping the grip head 12 around the enclosed object when downward pressure (e.g., pushing down on the grip head) is applied to the grip head 12 (i.e., when the grip head 12 is slid from the open position to the closed position). The downward pressure applied to the grip head 12 forces the grip head to collapse (i.e., the extended ends 17*a* and 17*b* move towards each other) into a closed state (see FIG. 4) from its open state (as the grip head 12 slides from the open position to the closed position). In an embodiment, the open position may be a default position of the grip head 12 (unnested position).

The ratchet strap 18 may be enclosed within housing 20 and may be attached to a center bottom region 29 of the group head 12 at a proximal end 25 and may be attached to a ratchet release 22 at a distal end 27. When downward pressure is applied to the grip head 12 (i.e., when the grip head 12 is slid from the open position to the closed position), the ratchet strap 18 may be forced to engage the ratchet release 22 which may secure (i.e., lock) the grip head at different positions (i.e., levels) throughout the ratchet strap's travel (i.e., descending into housing 20). The ratchet strap 18 may remain secured (i.e., locked) at a position until the ratchet release 22 is actuated. Moreover, as the grip head 12 descends into the housing 20, an inward pressure to grip an inserted object may be created. When the grip head 12 is nested inside the housing 20 (i.e., when the grip head is in the closed position), the extended ends 17*a* and 17*b* have been moved toward each other to encapsulate whatever object is inserted into the grip head 12 and the ratchet mechanism may hold (secure, lock) the grip head 12 until the release mechanism 22 is actuated.

The ratchet release 22 may be integrated in housing 20. The ratchet strap 18 and the ratchet release 22 may collectively operate as a ratchet mechanism providing movement (downward) in a direction and preventing movement in an opposite direction when the ratchet release 22 is not actuated. Such prevention of upward movement of the ratchet strap 18 may effectively secure (i.e., locks) the grip head 12 in the housing 20 until the ratchet release 22 is actuated. Upon actuating the ratchet release 22, the ratchet strap 18 is disengaged, e.g., from the lock of the ratchet release thereby allowing the grip head 12 to spring open. Once the grip head 12 is open, the inserted object may be removed from the grip head 12. When the ratchet release 22 is actuated, the disengagement from the ratchet strap 18 may result in an outward pressure from members of the grip head 12, e.g., against the housing 20, which may cause an auto open effect due to the grip heads' tendency to return to its original configuration (e.g., open position, which may be default).

The mount attachment point 24 may be configured to receive a corresponding mating contact integrated on an accessory (e.g., accessory 30, or accessory interface 30). The mount attachment point 24 may include a hole in the housing 20 (see FIG. 5). To securely attach the accessory to the mount attachment connection point 24, a knob 31 may be attached to the other side of the accessory 30 and a fastener may be used to attach the knob 31 and accessory 30 to the connection point 24. The knob 31 may include a threaded aperture 30 that aligns with an aperture on accessory 30 so that a fastener may thread through each aperture to securely affix the accessory 30 to connection point 24.

Figure 3:
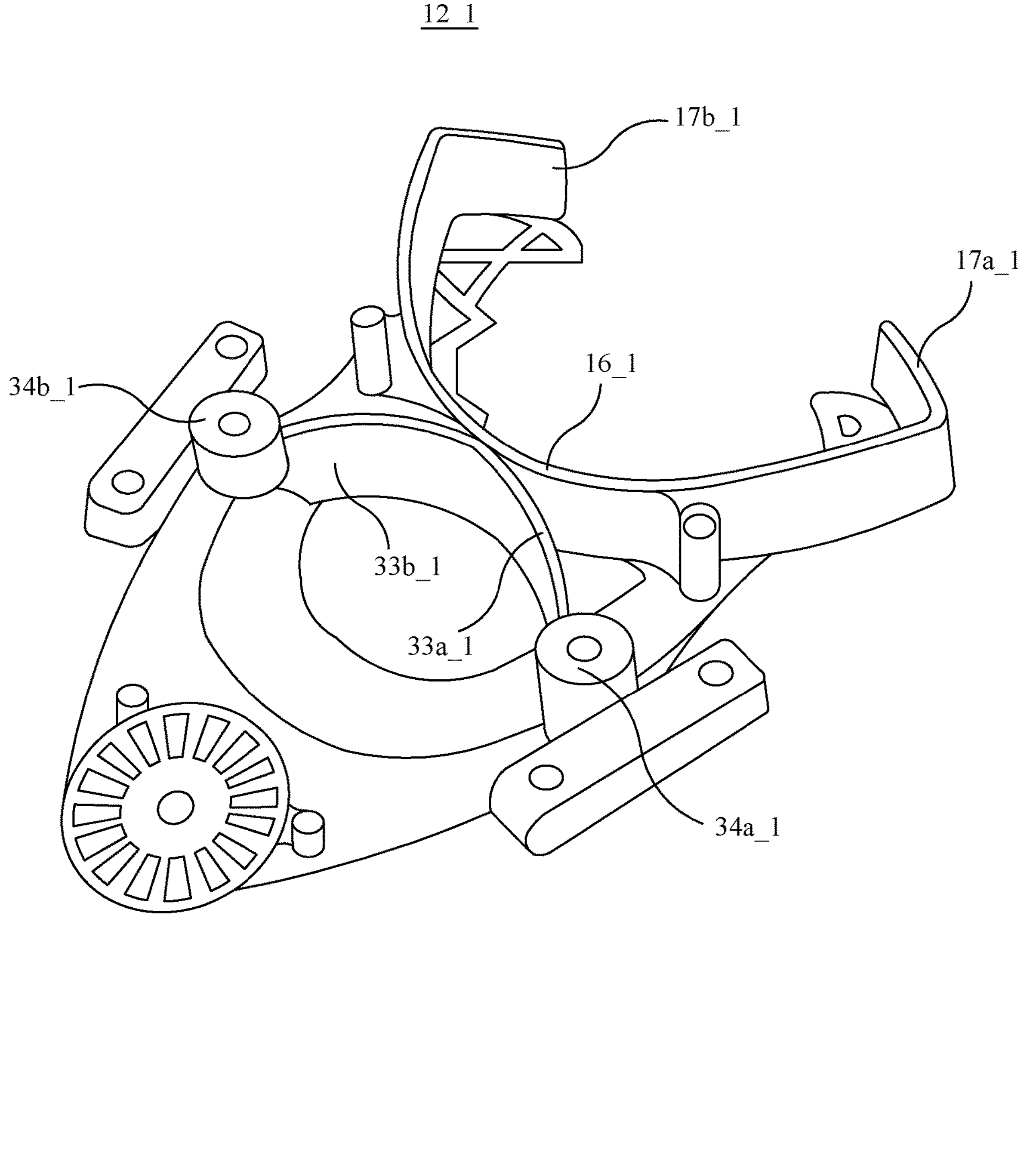
FIG. 3 is a schematic perspective view of components of a grip head in an open position according to another embodiment of the present disclosure.
Figure 4:
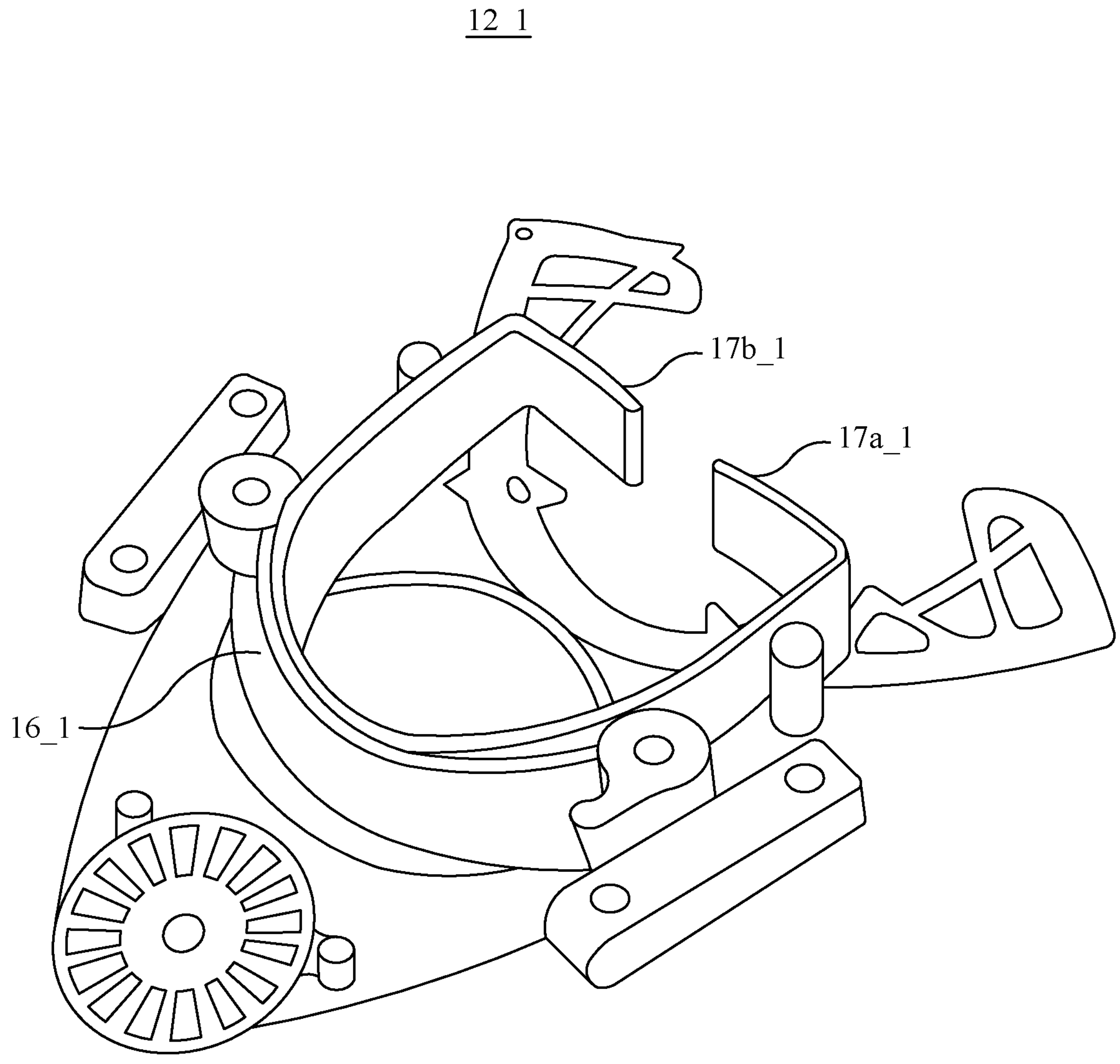
FIG. 4 is a schematic perspective view of components of the grip head of FIG. 3 in a closed position.

FIG. 3 is a schematic perspective view of components of a grip head 12_1 in an open position according to another embodiment of the present disclosure. FIG. 4 is a schematic perspective view of the components of the grip head 12_1 of FIG. 3 in a closed position. Components of the grip head 12_1 of FIGS. 3 and 4 may be the same as or similar to components of the grip head 12 of FIG. 1. Accordingly, redundant discussion may be omitted.

The grip head 12_1 may include a flexible shell 16_1 that may be a unitary structure including a first arm portion 16*a*_1 and a second arm portion 16*b*_1. Each arm portion may include an extended end 17*a*_1 and 17*b*_1 respectively, and each extended end may extend out from a respective arm portion in a perpendicular direction. The flexible shell 16_1 may be fixedly attached to first and second cam arms 33*a*_1 and 33*b*_1 respectively. The first and second cam arms 33*a*_1 and 33*b*_1 may be operatively connected to first and second cams 34*a*_1 and 34*b*_1, which together may roll against internal surfaces of the housing 20. In an embodiment, the first and second cam arms 33*a*_1 and 33*b*_1, the first and second cams 34*a*_1 and 34*b*_1, and the flexible shell 16 may provide a spring or memory force to the grip head 12_1.

The extended ends 17*a*_1 and 17*b*_1, along with the remaining arm structure, are configured to create a closure around an enclosed object thereby effectively wrapping the grip head 12_1 around the enclosed object when downward pressure (e.g., pushing down on the grip head) is applied to the grip head 12_1 (i.e., when the grip head 12_1 is slid from the open position to the closed position). The downward pressure applied to the grip head 12_1 forces the grip head to collapse (i.e., the extended ends 17*a*_1 and 17*b*_1 move towards each other) into a closed state (see FIG. 4) from its open state (See FIG. 3).

Figure 5:
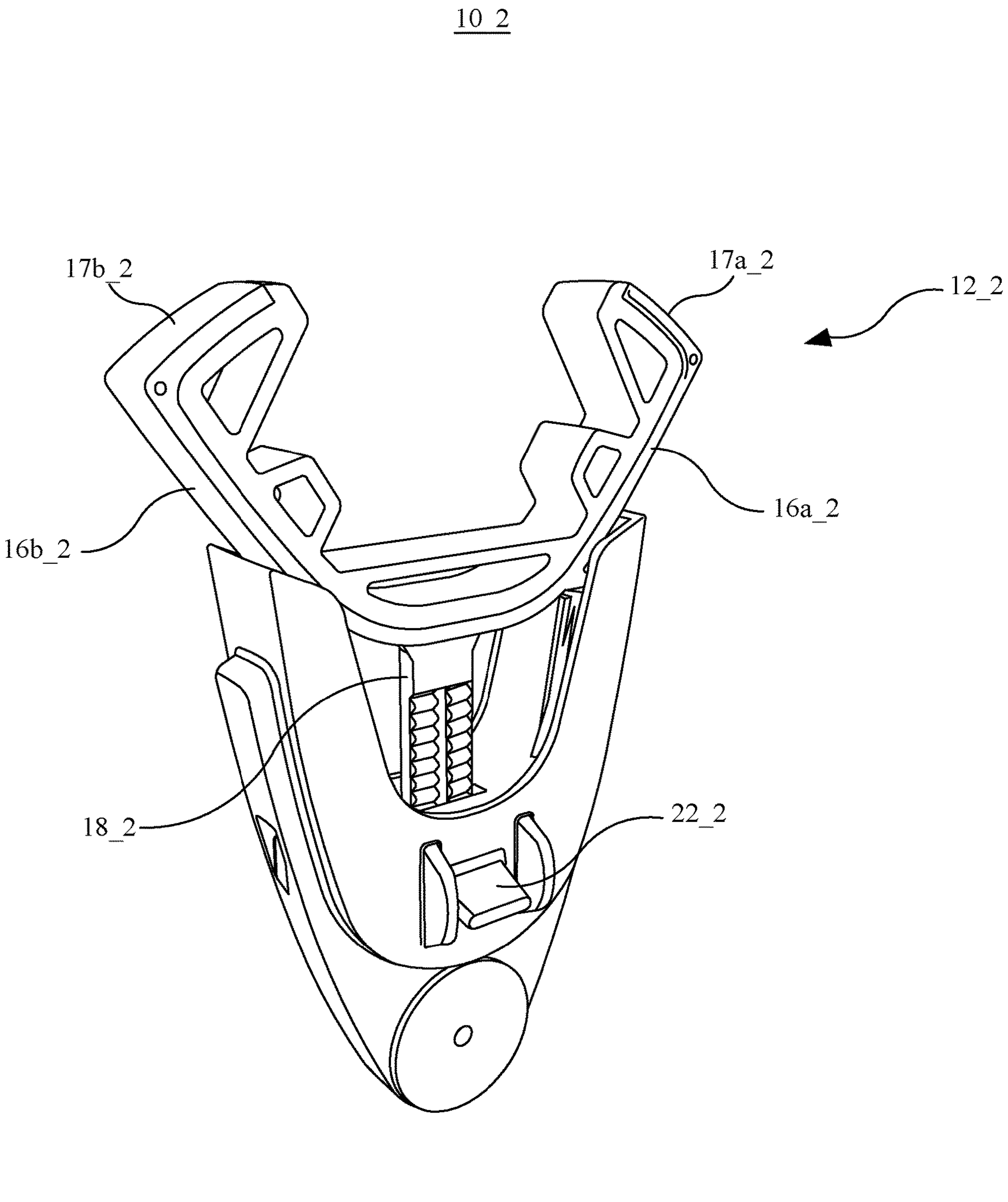
FIG. 5 is a schematic perspective view of a dual function grip-mount device according to another embodiment of the disclosure.

FIG. 5 is a schematic perspective view of a dual function grip-mount device 10_2 according to another embodiment of the disclosure. Components of the dual function grip-mount device 10_2 of FIG. 5 may be the same as or similar to components of the dual function grip-mount device 10 described in conjunction with FIG. 1. Accordingly, redundant discussion may be omitted.

The dual function grip-mount device 10_2 may include a grip head 12_2 including a flexible shell 16_2 including first and second arm portions 16*a*_2, 16*b*_2 and flexible gripper teeth 14_2. Each arm portion may include an extended end 17*a*_2 and 17*b*_2 respectively.

The dual function grip-mount device 10_2 may include a ratchet release 22_2. In the embodiment of FIG. 5, the ratchet release mechanism 22_2 may be a switch (ratchet buckle) that disengages from a ratchet strap 18_2.

Figure 6:
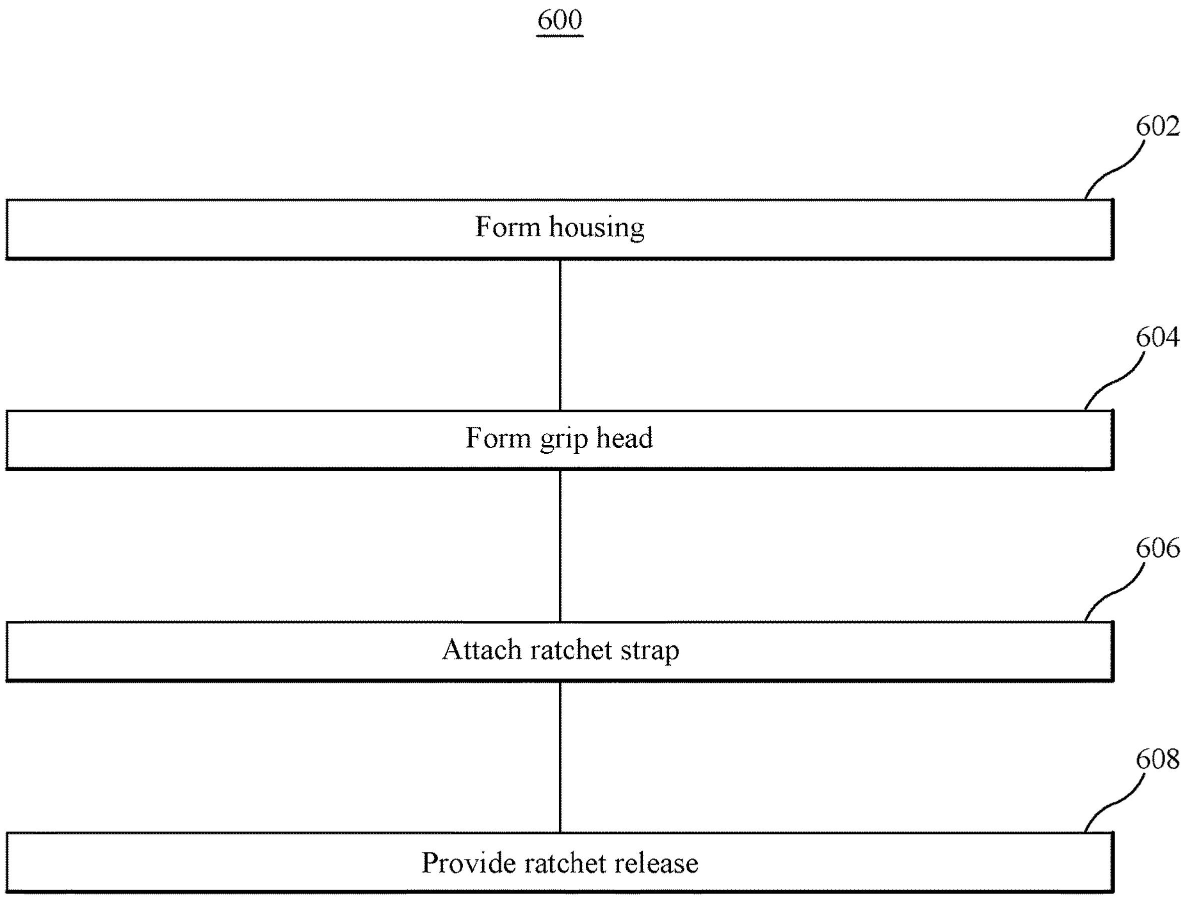
FIG. 6 is a flowchart schematically showing a method of manufacturing a dual function grip-mount device according to an embodiment of the disclosure.

FIG. 6 is a flowchart schematically showing a method 600 of manufacturing a dual function grip-mount device according to an embodiment of the disclosure. The method may include forming 602 a rigid housing including a cavity therein. The method may include forming 604 a flexible grip head slidable from an open position above the rigid housing into a closed position nested within the cavity of the rigid housing. The method may include attaching 606 a ratchet strap to a center bottom portion of the flexible grip head to extend downward from the flexible grip head into the cavity of the rigid housing. The method may further include providing 608 a ratchet release to engage the ratchet strap.

The method 600 may include additional forming, attaching, and providing operations as may be necessary in manufacturing the devices herein (e.g., dual function grip-mount devices). For example, the method 600 may include attaching a button or switch that disengages a ratchet buckle from the ratchet strap.

According to embodiments, a dual function grip-mount device and method of manufacturing the same may be provided. The embodiments provide advantages such as not relying exclusively on a friction fit to hold an object, avoiding damage to a secured object, and secure holding of the object. Further, the embodiments may be used to mount accessories. These and other advantages will be appreciated by one of ordinary skill in the art.

Embodiments of the disclosure are discussed above with reference to the figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present disclosure, recognize a multiplicity of alternate and suitable approaches, depending upon the needs of the particular application, to implement the functionality of any given detail described herein, beyond the particular implementation choices in the embodiments described and shown. That is, there are modifications and variations of the disclosure that are too numerous to be listed but that all fit within the scope of the disclosure.

Therefore, while the embodiments have been described in connection with particular examples thereof, the true scope of the disclosure should not be so limited since other modifications will become apparent to the skilled practitioner upon a study of the drawings, specification, and following claims.

What is claimed is:

1. A dual function grip-mount device, comprising:

a wishbone shaped rigid housing including a cavity therein;

a flexible grip head slidable from an open position above the wishbone shaped rigid housing into a closed position nested within the cavity of the wishbone shaped rigid housing;

a ratchet strap attached to a center bottom portion of the flexible grip head and extending downward from the flexible grip head into the cavity of the wishbone shaped rigid housing; and a ratchet release to engage the ratchet strap.

2. The dual function grip-mount device of claim 1, wherein the ratchet release engages the ratchet strap when the flexible grip head is slid into the closed position nested within the cavity of the wishbone shaped rigid housing, and the ratchet release disengages the ratchet strap upon actuation of the ratchet release, and the flexible grip head slides to the open position above the wishbone shaped rigid housing.

3. The dual function grip-mount device of claim 2, wherein the ratchet release comprises a button or switch that disengages a ratchet buckle from the ratchet strap.

4. The dual function grip-mount device of claim 1, wherein the flexible grip head and the ratchet strap collectively have a wishbone shape.

5. The dual function grip-mount device of claim 1, wherein the flexible grip head includes:

a flexible shell; and a plurality of flexible gripper teeth fixedly connected to the flexible shell.

6. The dual function grip-mount device of claim 5, wherein the flexible gripper teeth and the flexible shell are integral to each other.

7. The dual function grip-mount device of claim 5, wherein the flexible shell includes:

a first arm portion;

a second arm portion;

a first extended end extending out from the first arm portion; and a second extended end extending out from the second arm portion.

8. The dual function grip-mount device of claim 7, wherein the first extended end and the second extended end are brought closer together when the flexible grip head is slid into the closed position nested within the cavity of the wishbone shaped rigid housing, and the first extended end and the second extended end are extended farther from each other when the flexible grip head slides to the open position above the wishbone shaped rigid housing.

9. The dual function grip-mount device of claim 1, further comprising a mount attachment point to attach the dual function grip-mount device to an external accessory or accessory interface.

10. The dual function grip-mount device of claim 9, wherein the mount attachment point includes a hole in the wishbone shaped rigid housing.

11. The dual function grip-mount device of claim 10, further comprising a fastener engaged in the hole and a knob engaged with the fastener.

12. A device, comprising:

a wishbone shaped housing including a cavity therein;

a grip head slidable from an open position above the wishbone shaped housing into a closed position nested within the cavity of the wishbone shaped housing;

a ratchet strap attached to the grip head and extending from the grip head into the cavity of the wishbone shaped housing; and a ratchet release to engage the ratchet strap;

wherein the grip head and the ratchet strap collectively have a wishbone shape, the ratchet release engages the ratchet strap when the grip head is slid into the closed position nested within the cavity of the wishbone shaped housing, and the ratchet release disengages the ratchet strap upon actuation of the ratchet release, and the grip head slides to the open position above the wishbone shaped housing.

13. The device of claim 12, further comprising a mount attachment point to attach the device to an external accessory or accessory interface.

14. A method of manufacturing a dual function grip-mount device, the method comprising:

forming a wishbone shaped rigid housing including a cavity therein;

forming a flexible grip head slidable from an open position above the wishbone shaped rigid housing into a closed position nested within the cavity of the wishbone shaped rigid housing;

attaching a ratchet strap to a center bottom portion of the flexible grip head to extend downward from the flexible grip head into the cavity of the wishbone shaped rigid housing; and providing a ratchet release to engage the ratchet strap.

* * * * *